United States Patent
Ferraraccio et al.

(10) Patent No.: US 11,862,349 B2
(45) Date of Patent: Jan. 2, 2024

(54) INJECTING REACTANT INTO A SPENT FUEL POOL TO REACT WITH RADIOACTIVE EFFLUENT RELEASED INTO THE POOL FROM A NUCLEAR REACTOR CONTAINMENT

(71) Applicant: Westinghouse Electric Company LLC, Cranberry Township, PA (US)

(72) Inventors: Francis P. Ferraraccio, Southwick, MA (US); Timothy Jaeger, North Granby, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/648,280

(22) Filed: Jan. 18, 2022

(65) Prior Publication Data
US 2022/0215974 A1 Jul. 7, 2022

Related U.S. Application Data

(62) Division of application No. 15/819,264, filed on Nov. 21, 2017, now Pat. No. 11,227,696.

(51) Int. Cl.
*G21C 13/02* (2006.01)
*G21C 19/00* (2006.01)
(Continued)

(52) U.S. Cl.
CPC ........... *G21C 13/022* (2013.01); *G21C 9/004* (2013.01); *G21C 19/00* (2013.01); *G21C 13/10* (2013.01);
(Continued)

(58) Field of Classification Search
CPC ...... G21C 13/022; G21C 9/004; G21C 19/07; G21C 19/303; G21C 19/307; G21C 13/10
(Continued)

(56) References Cited

U.S. PATENT DOCUMENTS 4,238,290 A * 12/1980 Schabert ................. G21C 9/00
376/277
4,610,840 A 9/1986 Leach
(Continued)

FOREIGN PATENT DOCUMENTS

CN 109147981 A * 1/2019 ............. G21C 9/004
JP 2005181238 A 7/2005
(Continued)

OTHER PUBLICATIONS

Velusamy, "A fundamental approach to specify thermal and pressure loadings on containment buildings of sodium cooled fast reactors during a core disruptive accident", Annals of Nuclear Energy 38, No. 11 (2011): 2475-2487. (Year: 2011).*
(Continued)

*Primary Examiner* — Jack W Keith
*Assistant Examiner* — Daniel Wasil
(74) *Attorney, Agent, or Firm* — K&L Gates LLP

(57) ABSTRACT

A method of releasing an atmospheric effluent within a nuclear containment to an atmosphere surrounding the nuclear containment is disclosed. The nuclear containment is adjacent to an associated spent fuel pool that is located outside the nuclear containment, the method comprises sensing a pressure buildup within the nuclear containment, routing a portion of the atmospheric effluent through the spent fuel pool when a pressure buildup within the nuclear containment reaches a preselected value, and releasing a chemical into the spent fuel pool, based on the routing, to facilitate a reaction with the atmospheric effluent to substantially neuter any deleterious environmental impact of the atmospheric effluent.

15 Claims, 1 Drawing Sheet

(51) Int. Cl.
   *G21C 9/004* (2006.01)
   *G21C 13/10* (2006.01)
   *G21C 19/307* (2006.01)
   *G21C 19/303* (2006.01)

(52) U.S. Cl.
   CPC ......... *G21C 19/303* (2013.01); *G21C 19/307* (2013.01)

(58) Field of Classification Search
   USPC ......................................................... 376/272
   See application file for complete search history.

(56) References Cited

U.S. PATENT DOCUMENTS

| | | | |
|---|---|---|---|
| 4,661,312 | A | 4/1987 | Schweiger |
| 8,958,522 | B2* | 2/2015 | Sedlacek ................ B01D 45/10 |
| | | | 376/272 |
| 9,502,144 | B2 | 11/2016 | Nilsson |
| 10,886,032 | B2* | 1/2021 | Cook ..................... G21C 19/07 |
| 11,227,696 | B2 | 1/2022 | Ferraraccio et al. |
| 2006/0188055 | A1 | 8/2006 | Eckardt |
| 2014/0010340 | A1 | 1/2014 | Nilsson |
| 2015/0194226 | A1 | 7/2015 | Martin et al. |
| 2015/0235718 | A1 | 8/2015 | Freis et al. |

FOREIGN PATENT DOCUMENTS

| | | |
|---|---|---|
| JP | 4374243 B2 | 9/2009 |
| JP | 2012230078 A | 11/2012 |
| JP | 201444118 A | 3/2014 |
| KR | 101503288 B1 | 3/2015 |
| KR | 101555692 A | 9/2015 |
| WO | 2012166491 A1 | 12/2012 |
| WO | 2019103815 A1 | 5/2019 |

OTHER PUBLICATIONS

Hahm, "Safety Assessment of Candu Type Containment Building under Negative Internal Pressure" (2014). (Year: 2014).*
Guentay, "A Novel Process for Efficient Retention of Volatile Iodine Species in Aqueous Solutions during Reactor Accidents", In OECD Workshop on Implementation of Severe Accident Management Measures, ISAMM. 2009. (Year: 2009).*
Johnson, "Behavior of spent nuclear fuel in water pool storage", No. BNWL-2256. Battelle Pacific Northwest Labs., Richland, Wash. (USA), 1977. (Year: 1977).*
International Search Report and Written Opinion for International PCT Application No. PCT/US2018/058607, dated Feb. 22, 2019.
International Report on Patentability for International PCT Application No. PCT/US2018/058607, dated May 26, 2020.
Supplementary European Search Report for corresponding European Patent Application No. 18881147.5, dated Jul. 1, 2021.

* cited by examiner

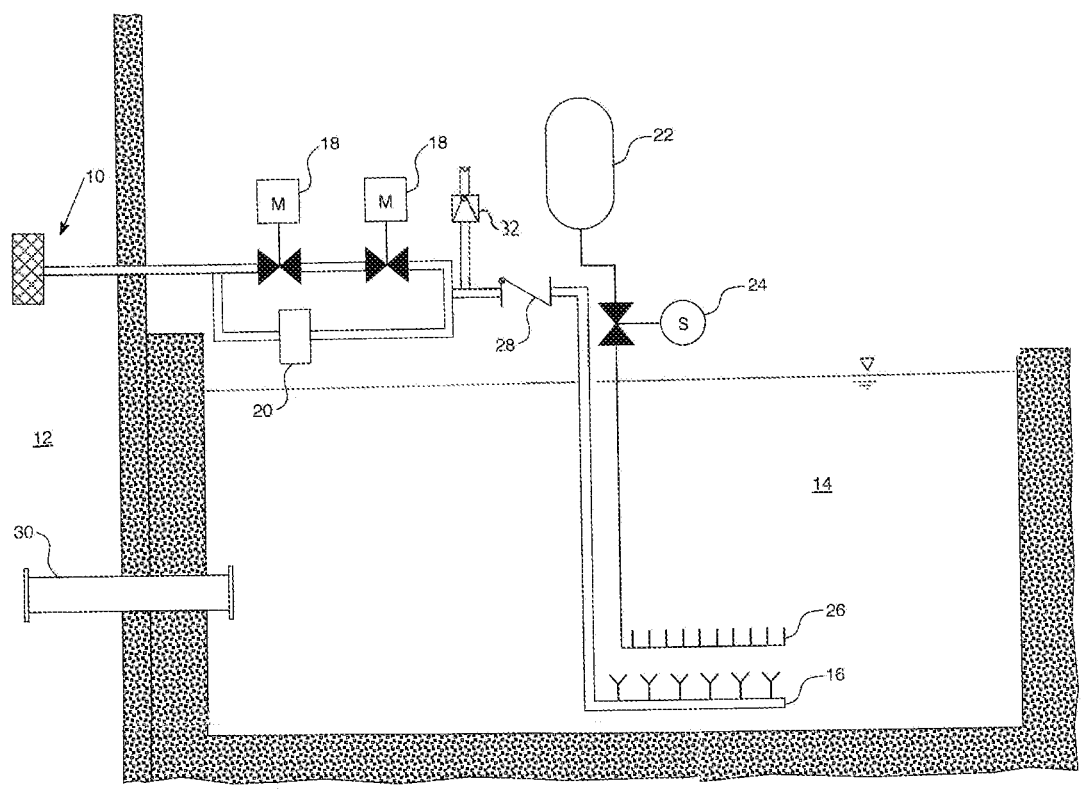

INJECTING REACTANT INTO A SPENT FUEL POOL TO REACT WITH RADIOACTIVE EFFLUENT RELEASED INTO THE POOL FROM A NUCLEAR REACTOR CONTAINMENT

CROSS-REFERENCE TO RELATED APPLICATIONS

This application is a divisional application claiming priority under 35 U.S.C. § 120 to U.S. patent application Ser. No. 15/819,264, entitled REACTOR CONTAINMENT BUILDING SPENT FUEL POOL FILTER VENT, filed Nov. 21, 2017, now U.S. Pat. No. 11,227,696, issued Jan. 18, 2022, the entire disclosures of which are hereby incorporated by reference herein.

BACKGROUND

1. Field

This invention pertains in general to nuclear reactor containment systems, and, more particularly, to nuclear reactor containment ventilation filtration systems for safely reducing pressure buildup within a containment without the release of harmful contaminants.

2. Related Art

In many jurisdictions, nuclear power plants must be designed to ensure that even in the event of accidents, a mechanism will be provided to prevent or minimize the escape of radioactive material and noble gases. To guard against radioactive releases, the reactor system is typically housed within a primary containment structure that is constructed from steel and reinforced concrete. The primary containment vessel is designed to be capable of withstanding large pressures which may result from various postulated accident scenarios. However, if a scenario is postulated to be sufficiently severe, the containment vessel itself could fail from gradually increasing pressure. Although the likelihood of such an event is considered very small, the health risks associated with exposing the surrounding population to the radioactive releases of such an event has led many to believe that a mechanism should be provided to vent the containment in a controlled manner and filter the gases to minimize the release of radioactivity. That is, it is desirable to both provide a pressure release device for the containment vessel and a mechanism for filtering any gases that may be released by the containment before they are released into the atmosphere.

The nuclear accidents at Chernobyl, Ukraine in 1986 and more recently Fukushima Dai-ichi in Japan in 2011, clearly show the consequences of a release of fission products with long decay times. As a result of these accidents, the governments of many countries have decided that nuclear power plants must install filtered containment ventilation systems to protect people and the surrounding land from damage due to radioactive contamination.

In the past, a number of filtration systems have been proposed, such as the one described in U.S. Pat. No. 4,610,840, issued to Leach and assigned to the Assignee of this invention. Leach discloses a fission product scrubbing system for a nuclear reactor. Specifically, a second compartment in fluid communication with the containment is partially filled with water. In the event of a large pressure increase, a ruptured disc disposed within a vent pipe emanating from the secondary compartment bursts to relieve pressure. When the rupture disc blows, radioactive gases and vapors from the containment pass through the water filled secondary compartment and are then released through the now open vent pipe. As the hot containment gases and vapors pass through the water stored within the enclosed secondary compartment, a large portion of the fission products will be scrubbed from the containment gases. While such a system can be effective, there is still room for improvement for reducing the size and increasing the effectiveness of such a system to minimize any exposure that such a release may potentially cause. U.S. Pat. No. 9,502,144, assigned to the Assignee of this invention, describes a filter system with such an improvement but still requires a significant investment to implement. Accordingly, a filtering system is desired that will effectively filter the release of the containment atmosphere to the external environment that requires a substantially reduced investment to implement.

SUMMARY

This invention provides a filtered venting system for a nuclear power generating facility having a containment for housing a nuclear reactor and for confining radiation leaked from the nuclear reactor. The containment has a ventilation outlet for providing a controlled release to the environment surrounding the containment, for an atmospheric pressure buildup within the containment in the event the pressure of an atmospheric effluent within the containment is built up to a level that exceeded a preselected value. The nuclear power generating facility also has, outside the containment, an associated spent fuel storage water pool, including a filter system for filtering contaminants released from or on route to the ventilation outlet. The filter system includes a dedicated piping system that is connected between an interior of the containment or the ventilation outlet and the spent fuel storage water pool, for fluidly communicating any atmospheric effluent to be released from inside of the containment through the spent fuel storage water pool. The filter system also includes one or more valves connected to the dedicated piping system for controlling the release of the atmospheric effluent to be released; and a chemical injection system configured to release a chemical into the spent fuel storage water pool to facilitate a reaction with the atmospheric effluent to be released to substantially neuter any deleterious environmental impact of the atmospheric effluent to be released. A control system is connected to one or more of the chemical injection systems and/or the one or more of the valves and is configured to control the release of the chemical and/or the release of the atmospheric effluent.

In one embodiment the dedicated piping system includes a check valve configured to prevent spent fuel pool water from being drawn into the containment. Preferably, the control system includes a manually actuated, remotely operated valve(s) in the dedicated piping system, the valve(s) being configured to isolate the dedicated vent piping under normal operating conditions, unless activated. Preferably, this configuration of valve(s) for isolation will be located outside of the containment building and will comply with the regulated requirements for isolation of piping that penetrates a containment building. The manually actuated, remote operated valve(s) is configured in the dedicated piping system to be in parallel with a passively operated valve structured to release the atmospheric effluent to the spent fuel water pool if a pressure is sensed within the containment in excess of a given pressure.

In another embodiment the dedicated piping system has an outlet in a lower portion of the spent fuel water pool that releases the atmospheric effluent to the spent fuel water pool through a sparger. Preferably, the chemical injection system releases the chemical into the spent fuel water pool through a chemical injection header that is supported just above the sparger within the spent fuel storage water pool. Desirably, the chemical injection header and the sparger are supported within the spent fuel storage water pool at an elevation below the area that is used to transfer fuel into and out of the spent fuel storage water pool and, preferably, as low as possible to maximize transit time of the released effluent through the water pool.

The invention also contemplates a method for operating such a filter system that includes the step of sensing a pressure buildup within the nuclear containment. The method routs a portion of the atmospheric effluent through the spent fuel pool when the pressure buildup within the containment reaches a preselected value and releases a chemical into the spent fuel pool to facilitate a reaction with the effluent to be released to substantially neuter any deleterious environmental impact of the effluent to be released. Preferably, the routing step and the releasing step are performed at the same time and the atmospheric effluent is introduced into water in the spent fuel pool through a sparger supported near or at a bottom of the spent fuel pool. Desirably the releasing step releases the chemical into water within the spent fuel pool at an elevation near the bottom of the spent fuel pool just above the sparger.

BRIEF DESCRIPTION OF THE DRAWINGS

A further understanding of the invention can be gained from the following description of the preferred embodiments when read in conjunction with the accompanying drawings in which:

FIG. 1 is a schematic view of a reactor containment building spent fuel pool filter vent in accordance with this invention.

DESCRIPTION OF THE PREFERRED EMBODIMENT

This invention involves an application specific design of piping, valves, control logic and a chemical injection system to effectively employ the concepts of a wet filtered vent design, such as the one described in U.S. Pat. No. 9,502,144, without the addition of a wet filter vent filtration tank. One embodiment of this invention is illustrated in FIG. 1, which shows a schematic representation of a portion of a nuclear containment and adjacent spent fuel pool. This invention uses ventilation piping 10 that directs a pressure relief discharge from the containment vessel 12 into the plant's existing spent fuel pool 14 through an engineered sparger design (or existing spent fuel pool cooling system sparger) 16. Isolation of the ventilation piping is achieved via conventional, remotely operated valve(s) 18, controlled to open by manual actuation by the plant operator. An alternate bypass system, with passive pressure relief valve 20, is available in the event of an operator error or mechanical failure of the isolation valve(s) 18. The bypass system automatically opens the valve 20, which is a passive pressure relief device, if a preselected pressure is sensed in the containment.

The contaminated aerosol release will be filtered via the spent fuel pool inventory, which will be treated with conventional wet filtration chemistry control via a passive chemical injection system 22 for gas (e.g., iodine, cesium, xenon) and fission product particulates removal. The chemicals will be released into the pool inventory simultaneous with the ventilation release to the pool. (i.e., opening of the ventilation isolation valves 18 or 20) via a controlled opening of the chemical injection system isolation valve 24. The chemicals will be injected directly above the sparger outlets 16 via a chemical injection header 26. Preferably, the chemical injection header and the sparger are supported in the spent fuel pool at an elevation, preferably, as low as possible in the pool and below the operating level necessary for fuel transfer into and out of the pool. The chemical injection header 26 is, preferably, positioned just above and over the sparger 16.

The consequential fission product decay heat energy released to the pool will be removed by the current spent fuel pool cooling system. Aerosol release from the spent fuel pool surface will be vented from the spent fuel building via normal or special supplemental, if necessary, spent fuel pool ventilation systems. Liquid swell in the spent fuel pool will not be sufficient to displace excessive pool inventory such that acceptable spent fuel bundle submergence remains for shielding the spent fuel following closure of the vent isolation valves. Check valve(s) (passive dampers) 28 in the ventilation piping will prevent draw of pool inventory into containment during any containment vessel vacuum; similarly, a passive vacuum breaker 32 will prevent the containment vessel from exceeding a maximum vacuum limit.

While specific embodiments of the invention have been described in detail, it will be appreciated by those skilled in the art that various modifications and alternatives to those details could be developed in light of the overall teachings of the disclosure. An example could be to avoid installation of a unique containment vessel penetration, an alternate embodiment could incorporate the device into the existing fuel transfer tube 30. Accordingly, the particular embodiments disclosed are meant to be illustrative only and not limiting as to the scope of the invention which is to be given the full breadth of the appended claims and any and all equivalents thereof.

What is claimed is:

1. A method of releasing an atmospheric effluent within a nuclear containment to an atmosphere surrounding the nuclear containment, the nuclear containment being adjacent to an associated spent fuel pool that is located outside the nuclear containment, the method comprising:

sensing a pressure buildup within the nuclear containment;

routing a portion of the atmospheric effluent through the spent fuel pool when a pressure buildup within the nuclear containment reaches a preselected value, wherein the routing includes introducing the atmospheric effluent into water in the spent fuel pool through a sparger supported near or at a bottom of the spent fuel pool; and releasing a chemical into the spent fuel pool, based on the routing, to facilitate a reaction with the atmospheric effluent to substantially neuter any deleterious environmental impact of the atmospheric effluent, wherein the releasing comprises releasing the chemical into water within the spent fuel pool at an elevation near the bottom of the spent fuel pool proximate to the sparger.

2. The method of claim 1, wherein the routing and the releasing are performed at approximately the same time.

3. A method of releasing effluent within a nuclear containment into a spent fuel pool, comprising:

sensing a pressure within the nuclear containment;

routing a portion of the effluent into the spent fuel pool, based on the pressure reaching a threshold, wherein the routing includes introducing the portion of the effluent into water in the spent fuel pool through a sparger supported proximate to the bottom of the spent fuel pool; and releasing a chemical into the spent fuel pool, based on the portion of the effluent being routed to the spent fuel pool, wherein the releasing comprises releasing the chemical into the spent fuel pool at a location proximate to the sparger, wherein the location is proximate to the bottom of the spent fuel pool.

4. The method of claim 3, wherein the routing and the releasing are performed at approximately the same time.

5. The method of claim 3, wherein the location is at an elevation above the sparger.

6. The method of claim 3, further comprising controlling a release of the effluent from the nuclear containment.

7. The method of claim 3, further comprising controlling a release of the chemical into the spent fuel pool.

8. A method of releasing effluent within a nuclear containment into a spent fuel pool, comprising:
routing a portion of the effluent from the nuclear containment toward the spent fuel pool;
releasing, via a sparger, the routed effluent into the spent fuel pool at a first location, wherein the first location is near the bottom of the spent fuel pool; and
releasing a chemical into the spent fuel pool at a second location proximate to the first location, based on the routed effluent being released into the spent fuel pool.

9. The method of claim 8, wherein the routing and the releasing the chemical are performed at approximately the same time.

10. The method of claim 8, wherein the second location is at an elevation above the first location.

11. The method of claim 8, further comprising controlling a release of the effluent from the nuclear containment.

12. The method of claim 8, further comprising controlling a release of the chemical into the spent fuel pool.

13. The method of claim 8, wherein routing the portion of the effluent from the nuclear containment toward the spent fuel pool comprises routing the portion of the effluent along a first path from the nuclear containment to the spent fuel pool, and wherein the method further comprises:
sensing a pressure within the nuclear containment; and
rerouting the effluent along a second path based on the pressure reaching a threshold, wherein the second path is different than the first path.

14. The method of claim 8, further comprising preventing inventory of the spent fuel pool from being routed into the nuclear containment during a nuclear containment vacuum.

15. The method of claim 8, further comprising preventing the nuclear containment from exceeding a maximum vacuum limit.

* * * * *